(12) United States Patent
Hunt et al.

(10) Patent No.: US 11,218,691 B1
(45) Date of Patent: *Jan. 4, 2022

(54) UPSAMPLING CONTENT FOR HEAD-MOUNTED DISPLAYS

(71) Applicant: Facebook Technologies, LLC, Menlo Park, CA (US)

(72) Inventors: Warren Andrew Hunt, Woodinville, WA (US); Devin Boyer, Redmond, WA (US); Nathan Bialke, Seattle, WA (US); William Howe-Lott, Issaquah, WA (US); Hung Huu Nguyen, Sammamish, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/996,189

(22) Filed: Aug. 18, 2020

Related U.S. Application Data

(63) Continuation of application No. 15/907,104, filed on Feb. 27, 2018, now Pat. No. 10,785,471.

(60) Provisional application No. 62/505,688, filed on May 12, 2017.

(51) Int. Cl.
*H04N 13/327* (2018.01)
*H04N 13/332* (2018.01)
*H04N 13/366* (2018.01)
*H04N 13/139* (2018.01)

(52) U.S. Cl.
CPC ......... *H04N 13/327* (2018.05); *H04N 13/139* (2018.05); *H04N 13/332* (2018.05); *H04N 13/366* (2018.05)

(58) Field of Classification Search
CPC .......... G06F 3/011–013; G06T 19/006; G06T 19/20; G02B 27/0093; G02B 27/017; G02B 27/0172; G02B 27/0179; G02B 2027/0121; G02B 2027/0138; G02B 2027/014; G02B 2027/0145; G02B 2027/0147; G02B 2027/0178; G02B 2027/0187; H04N 13/139; H04N 13/156; H04N 13/167; H04N 13/327–344; H04N 13/366–383
See application file for complete search history.

(56) References Cited

U.S. PATENT DOCUMENTS

| | | |
|---|---|---|
| 2014/0176603 A1 | 6/2014 | Kumar et al. |
| 2015/0029218 A1 | 1/2015 | Williams et al. |
| 2015/0193949 A1 | 7/2015 | Katz et al. |
| 2015/0312468 A1 | 10/2015 | Taylor et al. |
| 2017/0039926 A1 | 2/2017 | Greer, III |

(Continued)

*Primary Examiner* — Nathan Danielsen
(74) *Attorney, Agent, or Firm* — Fenwick & West LLP

(57) ABSTRACT

A system for content upsampling comprises a console and a head-mounted display (HMD). The console can select content for presentation and provide the content at a first frame rate. The HMD outputs fast calibration data comprising one or more intermediate estimated positions of a reference point on the HMD. The HMD estimates future positions of the HMD using the fast calibration data, and generates synthetic frames using frames from the content and the future positions of the HMD. The HMD then upsamples the content from the first frame rate to a second frame using the synthetic frames to generate augmented content, wherein the second frame rate is faster than the first frame rate. The HMD presents the augmented content at the second frame rate via an electronic display.

20 Claims, 4 Drawing Sheets

(56) References Cited

U.S. PATENT DOCUMENTS

| | | |
|---|---|---|
| 2017/0045941 A1 | 2/2017 | Tokubo et al. |
| 2017/0155885 A1 | 6/2017 | Selstad et al. |
| 2017/0243324 A1 | 8/2017 | Mierle et al. |
| 2018/0075654 A1 | 3/2018 | Vembar et al. |
| 2018/0146189 A1 | 5/2018 | Park |

UPSAMPLING CONTENT FOR HEAD-MOUNTED DISPLAYS

CROSS-REFERENCE TO RELATED APPLICATIONS

This application is a continuation of co-pending U.S. application Ser. No. 15/907,104, filed Feb. 27, 2018, which claims benefit of U.S. Provisional Patent Application Ser. No. 62/505,688, filed May 12, 2017, which are hereby incorporated by reference in their entirety.

BACKGROUND

The present disclosure generally relates to head-mounted displays (HMDs), and specifically, to upsampling content for presentation on HMDs.

Artificial reality is a simulated environment created by computer technology and presented to a user, often via some form of HMD. In these systems some sort of console generates a content feed which is then sent to the HMD, and the HMD presents the content to the user. Bandwidth requirements for the coupling between the console and the HMD can be quite high, and are high enough that it can make wireless coupling between the console and the HMD not-feasible. Moreover, a large portion of the bandwidth is allocated to the content that is the HMD is presenting to the user, leaving a small amount of bandwidth that is available for other functions (e.g., telemetry, commands, etc.). While compression algorithms exist (e.g., Display Screen Compression) that reduce bandwidth limitations for sending content between devices, they are not able to meet requirements for HMD systems. Moreover, movement of a user wearing a HMD can affect what content is actually being presented to a user, and conventional algorithms are not able to keep up resulting in motion blur in the displayed content.

SUMMARY

A system for content upsampling comprises a console and a head-mounted display (HMD). The HMD includes an electronic display, an inertial measurement unit (IMU), a content augmentation module comprising a frame buffer, a position prediction module and an upsampling module. The console selects content for presentation. In some embodiments, the console provides the original content at a first frame rate. The frame buffer receives and stores content for presentation at a first frame rate. The IMU outputs fast calibration data comprising one or more intermediate estimated positions of a reference point on the HMD. The position prediction module estimates one or more future positions of the HMD using the fast calibration data. The upsampling module generates one or more synthetic frames using one or more frames from the content and the one or more future positions of the HMD. The upsampling module then upsamples the content from the first frame rate to a second frame using the one or more synthetic frames to generate augmented content, wherein the second frame rate is faster than the first frame rate. The electronic display of the HMD presents the augmented content at the second frame rate.

In some other embodiments, the console estimates one or more future positions of the HMD using the fast calibration data from the HMD, generates warping parameters based on at least one of the one or more future positions of the HMD and the content, processes the content using the warping parameters to generate adjusted content, and provides the adjusted content to the HMD at the first frame rate. The upsampling module of the HMD may generate one or more synthetic frames using one or more frames from the adjusted content. The upsampling module may then upsample the adjusted content from the first frame rate to the second frame using the one or more synthetic frames to generate augmented content for presentation via the electronic display at the second frame rate.

Figure 1:
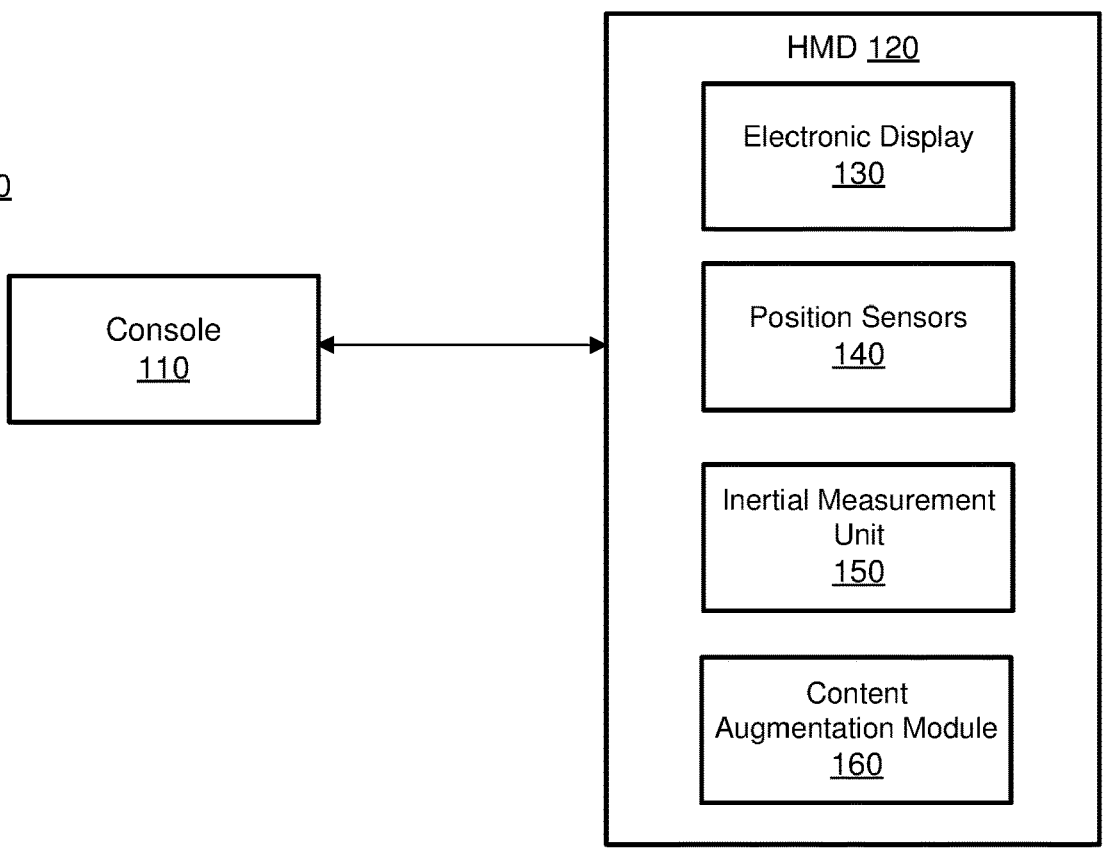
FIG. 1 is high level block diagram of a head-mounted display (HMD) system that upsamples content, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Configuration Overview

A HMD system is configured to present augmented content via a HMD to the user. Augmented content is audio and/or video content whose frame rate has been increased using synthetic frames. The HMD system can be used in artificial reality systems. The HMD system includes a console that is communicatively coupled to a HMD. The console includes at least one processor and a memory coupled to the processor and including instructions that, when executed by the processor, cause the processor to:

select content for presentation, and provide the content to the HMD at a first frame rate, where frames within the content are referred to as original frames.

The HMD includes an inertial measurement unit (IMU). The IMU is configured to output fast calibration data comprising one or more intermediate estimated positions of a reference point on the HMD. The HMD estimates one or more future positions of the HMD using the fast calibration data. The HMD generates a plurality of synthetic frames using frames from the content and the estimated future positions of the HMD. A synthetic frame is an image frame created by warping and/or shifting features of an original content frame based on a predicted future location that the HMD would be in at a time that the synthetic frame is being presented by the HMD. The HMD upsamples the content from the first frame rate to a second frame rate using the synthetic frames to generate the augmented content, and presents the augmented content at the second frame rate via an electronic display.

The first frame rate is relatively low (e.g., ~45-90 frames per second), and frees up bandwidth between the console and the HMD for other data (e.g., telemetry, etc.). The second frame rate is substantially faster (e.g., 480 frames per second) than the first frame rate. Additionally, some or all of the synthetic frames are associated with respective estimated future positions. The fast frame rate and frames tied to estimated future positions of the HMD mitigates motion blur that could otherwise occur using a slower frame rate when there is movement of the HMD. HMDs commonly use low persistence displays to reduce retinal motion blur, and these displays typically have an illumination interval between 1 ms and 2 ms. Increasing to a fast frame rate allows these intervals to occur more often, and assuming a same display intensity as some slower frame rate, the fast frame rate would result in an increase in brightness of the displayed content. And a brighter display allows for use with HMDs that include optics that attenuate light from the display. Moreover, in some cases, it takes less energy to render a synthetic frame than an original frame (e.g., an I-frame). Accordingly, power requirements are substantially less for rendering augmented content at a given frame rate—than for rendering only full frames at the given frame rate.

In alternate embodiments, the console estimates one or more future positions of the HMD using the fast calibration data from the HMD. The console generates warping parameters based on the one or more estimated future positions and/or content to be rendered by the HMD (e.g., motion of a virtual object). Warping parameters are parameters that, based on an estimated future position of the HMD, warp an original frame to generate a synthetic frame. The console warps the content to create adjusted content using the warping parameters to do some compensation for motion (e.g., of the HMD, one or more virtual objects, etc.) and/or correct for optical distortions caused by one or more optical elements in the HMD, and provides the adjusted content to the HMD. The HMD generates a plurality of synthetic frames using the adjusted content. Additionally, in some embodiments, the HMD may perform additional motion compensation in the creation of the synthetic frames from the adjusted content. The HMD upsamples the adjusted content from the first frame rate to a second frame rate using the synthetic frames to generate the augmented content, and presents the augmented content at the second frame rate via an electronic display.

System Overview

FIG. 1 is a high level diagram of an HMD system 100 that upsamples content, in accordance with one or more embodiments. The HMD system 100 includes a console 110 that is communicatively coupled to a HMD 120. The console 110 may have a wired (e.g., electrical, fiber, etc.) and/or wireless coupling to the HMD 120. The coupling has a finite bandwidth that is used to, e.g., provide content to the HMD 120, communicate telemetry data between the console 110 and the HMD 120, etc. For example, the bandwidth of a conventional copper coupling between the console 110 and the HMD 120 may be approximately 25.92 Gigabits/second (Gb/s).

The console 110 determines content for providing to the HMD 120. The content may be compressed or uncompressed. The console 110 determines the content based in part on a location of the HMD 120. The console 110 provides the content to the HMD 120 at a low frame rate. Frames within the content are referred to as original content frames. For example, the low frame rate may range from about 45 to 100 frames per second (fps). Taking for example, a low frame rate of 90 fps and a 1200×1080 pixel display (2 eyes), with 24 bits per pixel, this would correspond to a bandwidth of 5.56 Gb/s. A High-Definition Multimedia Interface (HDMI) link may have a bandwidth of approximately 8.165 Gb/s, which would result in 2 Gb/s of extra bandwidth.

The HMD 120 is a head-mounted display that presents content to a user. Examples of content presented by the HMD 120 include one or more images, video, audio, or some combination thereof. Example embodiments of the HMD 120 are further described below in conjunction with FIGS. 4 and 5.

The HMD 120 includes at least an electronic display 130, one or more position sensors 140, an IMU 150, and a content augmentation module 160. The electronic display 130 displays augmented content the user in accordance with data received from the console 110. Augmented content is audio and/or video content whose frame rate has been increased using synthetic frames. Generation of the augmented content is discussed below in detail with regard to FIG. 2. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode (AMOLED) display, a transparent organic light emitting diode (TOLED) display, some other display, or some combination thereof.

The IMU 150 is an electronic device that generates fast calibration data based on measurement signals received from one or more of the position sensors 140. A position sensor 140 generates one or more measurement signals in response to motion of the HMD 120. Examples of position sensors 140 include: one or more accelerometers, one or more gyroscopes, one or more magnetometers, or any other suitable type of sensor, or some combination thereof. The position sensors 140 may be located external to the IMU 150, internal to the IMU 150, or some combination thereof.

Based on the one or more measurement signals from one or more position sensors 140, the IMU 150 generates fast calibration data indicating a plurality of estimated positions of the HMD 120 that are associated with different respective time values within a series of time values. Additionally, in some embodiments, the fast calibration data may also include an estimated velocity vector and/or acceleration vector for the HMD 120 for some of the time values. In some embodiments, the velocity vector includes information about a velocity of the HMD 120 and a direction in space where the HMD 120 is moving at a particular time instant.

The acceleration vector may include information about acceleration of the HMD 120 and a direction in space where the HMD 120 is moving at a particular time instant. For example, the position sensors 140 include multiple accelerometers to measure translational motion (forward/back, up/down, left/right) and multiple gyroscopes to measure rotational motion (e.g., pitch, yaw, roll). In some embodiments, the IMU 150 rapidly samples the measurement signals and calculates the estimated position of the HMD 120 from the sampled data. For example, the IMU 150 integrates the measurement signals received from the accelerometers over time to estimate a velocity vector and integrates the velocity vector over time to determine an estimated position of a reference point (e.g., intermediate estimated position) on the HMD 120 for a given time. The IMU 150 packages the position information of the reference point for the series of time values as the fast calibration data. Additionally, in some embodiments, the IMU 150 also includes velocity vectors and/or acceleration vectors for one or more of the time values in the series of time values within the fast calibration data. Alternatively, the IMU 150 provides the sampled measurement signals to the console 110, which determines the fast calibration data. The reference point is a point that may be used to describe the position of the HMD 120. While the reference point may generally be defined as a point in space; however, in practice the reference point is defined as a point within the HMD 120 (e.g., a center of the IMU 150). The IMU 150 is configured to output fast calibration data comprising a plurality of intermediate estimated positions of a reference point on the HMD at different time values. The IMU 150 outputs the fast calibration data at a rate of, e.g., 200 Hz or more (e.g., 1 KHz, 10 KHz, etc.).

The content augmentation module 160 generates augmented content using the fast calibration data, and provides the augmented content to the electronic display 130 for presentation. Details of the content augmentation module 160 are discussed below with regard to FIG. 2.

Note, that while the content augmentation module 160 is shown in the HMD 120, in alternate embodiments, some of the functionality of the content augmentation module 160 may be performed on the console 110. For example, the console 110 may estimate future positions of the HMD 120, and then determine warping parameters for some or all of the estimated positions. Warping parameters are parameters that, based on an estimated future position of the HMD 120, warp an original frame to generate a synthetic frame. Warping parameters can include, e.g., a warping vector for every n×n tile in a frame, some other parameter that is used to generate a synthetic frame, or some combination thereof. For example, assuming n=8, in a 1200*1080 pixel display, there can be a mesh of 150×135 warping vectors, and each warping vector includes a Macroblock X coordinate, a Macroblock Y coordinate, a Motion Vector X magnitude, and Motion Vector Y magnitude. The image is then warped in the direction of that motion vector to form an adjusted frame, and a plurality of adjusted frames make up adjusted content. In some embodiments, the adjusted frame may also include corrections in distortion that would otherwise be caused by an optics block (e.g., a lens) within the HMD 120. One or more adjusted frames may be referred to herein as adjusted content. The console 110 provides the adjusted content to the HMD 120. And the HMD 120 generates a plurality of synthetic frames using the adjusted content. In this manner the console 110 is able to perform some compensation for head motion at the console 110, and the HMD 120 can further compensate for the head motion as part of an upsampling on the HMD 120. This offloads some of the graphics processing to the console 110 which reduces such requirements on the HMD 120.

Figure 2:
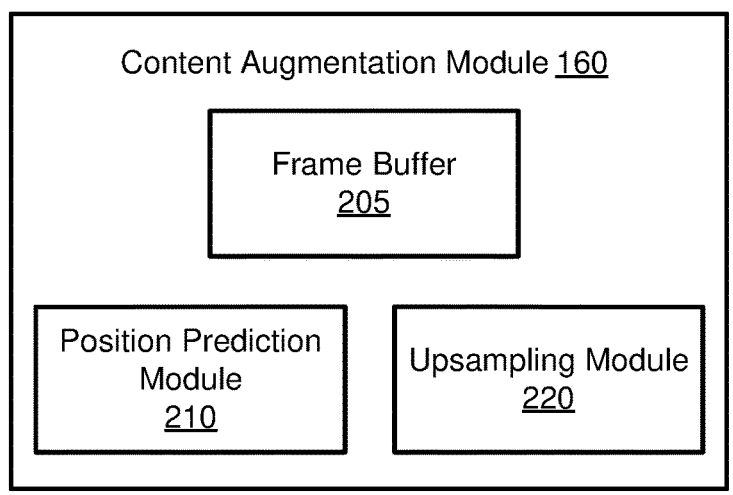
FIG. 2 is a block diagram of a content augmentation module, in accordance with one or more embodiments.

FIG. 2 is a block diagram of a content augmentation module 160, in accordance with one or more embodiments. The content augmentation module 160 comprises a frame buffer 205, a position prediction module 210 and an upsampling module 220. In other embodiments, the content augmentation module 160 comprises additional or fewer modules than those described herein. Similarly, the functions can be distributed among the modules and/or different entities (e.g., the console 110) in a different manner than is described here.

The frame buffer 205 stores content received from the console 110. The frame buffer 205 stores a plurality of frames. The types of frames stored may include, e.g., an original frame, an adjusted frame, a synthetic frame, or some combination thereof. In some embodiments, the frame buffer 205 is a double buffer that stores a most recent frame received from the console 110, and a frame previous to the most recent frame received from the console 110. In some embodiments, the frame buffer 205 may be part of the electronic display 130 of the HMD 120.

The position prediction module 210 estimates one or more future positions of the HMD 120 using the fast calibration data. The position prediction module 210 extracts the intermediate positions of the reference point from the fast calibration data. In some embodiments, the position prediction module 210 also extracts velocity vector information and/or acceleration vector information from the fast calibration information. In other embodiments, the position prediction module 210 uses the positions of the reference point (which may also include the intermediate positions of the reference point) and their associated time values to determine velocity vectors and/or acceleration vectors for the reference point for different time values. For example, the position prediction module 210 can use a position of the reference point at a most recent time "$T_r$," a velocity vector at $T_r$, and the acceleration vector at $T_r$, to predict a position of the reference point at some future time $T_{future}$. The position prediction module 210 may utilize one or more standard motion estimation algorithms to determine the estimated one or more future positions. A motion estimation algorithms may include, e.g., Kalman filtering, complementary filtering, some other algorithm that can predict a future position of the HMD 120, or some combination thereof.

The upsampling module 220 determines a number of synthetic frames to generate based on a frame rate ($R_{low}$) of the content provided by the console 110 (e.g., 100 fps), and a target frame rate ($R_{high}$) for augmented content (e.g., 500 fps). A synthetic frame is an image frame created by warping features of an original content frame based on a predicted future location that the HMD 120 would be in while the synthetic frame is being presented by the HMD 120. In some embodiments, the upsampling module 220 determines the number of synthetic frames based on integer frame rate multiplication. For example, the upsampling module multiplies the content frame rate by some integer N (e.g., N=8) to determine a target frame rate. $R_{low}$ has a corresponding period $T_{low}$, and $R_{high}$ has a corresponding period $T_{high}$. In some embodiments, the number of synthetic frames to generate between adjacent original frames is $(T_{high}/T_{low})-1$. For example, 100 fps corresponds to a frame every 10 ms, and 500 fps corresponds to a frame every 2 ms. Accordingly, to achieve 500 fps or, in other words, a frame every 2 ms, four (10 ms/2 ms−1) synthetic frames should be generated for every 10 ms time period. And one period of augmented content would have an original frame followed by the four additional synthetic frames.

The upsampling module 220 generates a plurality of synthetic frames using frames from the content and the estimated future positions of the HMD 120. The upsampling module 220 may be configured to perform inverse warp that maps coordinates on the original content image to locations on the electronic display 130 in the HMD 120 (i.e., the pixels coordinates on the electronic display 130). The upsampling module 220 generates one or more synthetic frames based on the inverse warp of the original content image. In some embodiments, using the inverse warp, the upsampling module 220 maps coordinates on the original content image having sub-pixel resolution to locations on the electronic display 130, i.e., maps sub-pixel coordinates on the original content image to pixel locations on the electronic display 130. In one embodiment, the sub-pixel coordinates are interpolated using, e.g., bicubic interpolation. In another embodiment, the sub-pixel coordinates are interpolated using bilinear interpolation. In yet another embodiment, the sub-pixel coordinates are interpolated using bilinear interpolation. In some embodiments, the upsampling module 220 is coupled to a partial-frame buffer (not shown in FIG. 2) enabling the image warp to be performed as a streaming process, thus reducing latency for generation of warped content. The usage of partial-frame buffer in the HMD 120 for the image warp process can significantly improve user's perceptual experience as full frame latencies may cause perceptual issues in artificial reality applications.

In some embodiments, the upsampling module 220 generates a synthetic frame using Yaw/Pitch Correction. In this embodiment, the upsampling module 220 identifies yaw/pitch of the HMD 120 via the fast calibration data, and then translates (e.g., shifting the image up/down/left/right a few pixels) the image in x dimension and y dimension to form a synthetic frame that compensates for the movement. In other embodiments, the upsampling module 220 generates a synthetic frame using asynchronous space warp (ASW). In this embodiment, the upsampling module 220 calculates a spatial difference between blocks of a current frame and a previous frame (via motion vectors) and then warps the image based on those motion vectors to produce a synthetic frame—which is a future prediction of the image.

In some embodiments, the content augmentation module 160 is configured to increase resolution of the original content frame using any of the aforementioned warping methods (e.g., Yaw/Pitch Correction, ASW, inverse warp, etc.). In the illustrative embodiment, the upsampling module 220 may increase, via warping, resolution of original content rendered for 720p resolution (i.e., 1280×720 pixels resolution) at 30 Hz into warped content displayed using 1080p resolution (i.e., 1920×1080 pixels resolution) at 90 Hz. The increase of image resolution in this manner can be advantageous in compute-limited artificial reality applications.

In some embodiments, the upsampling module 220 receives adjusted content from the console 110 along with the content. The upsampling module 220 then generates synthetic frames using the adjusted content. Note that this embodiment likely has more latency than the embodiment discussed above where HMD 120 determines synthetic frames without warping parameters from the console 110. This is due in part to time it takes for the console to, e.g., receive the fast calibration data from the HMD 120, estimate the future positions of the HMD 120, determine the warping parameters, communicate the warping parameters to the HMD 120, and also for the HMD then generating the synthetic frames. However, as some (or potentially all of) of the motion compensation is done by the console 110, it reduces the graphic processing requirements of the HMD 120.

The upsampling module 220 upsamples the content from the low frame rate to the high frame using the synthetic frames to generate the augmented content. The upsampling module 220 provides the augmented content at the high frame rate to an electronic display 130 for presentation.

Figure 3:
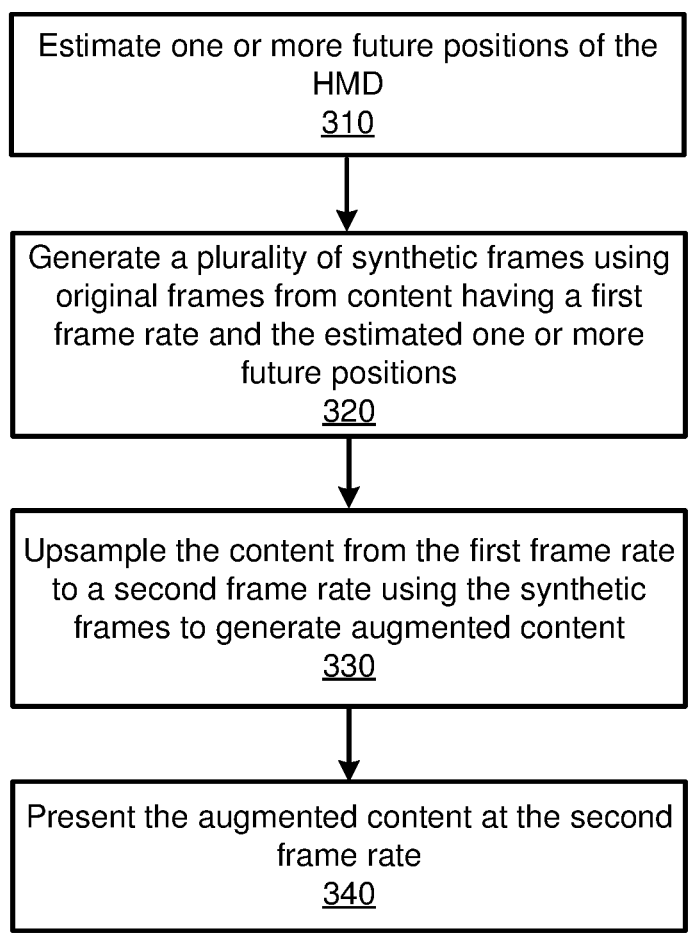
FIG. 3 is a flow chart of an example process for generating augmented content, in accordance with one or more embodiments.

FIG. 3 is a flow chart of an example process 300 for generating augmented content in accordance with an embodiment. The process 300 of FIG. 3 may be performed by the HMD 120. Other entities (e.g., the console 110) may perform some or all of the steps of the process in other embodiments. Likewise, embodiments may include different and/or additional steps, or perform the steps in different orders.

The HMD 120 estimates 310 one or more future positions of the HMD 120. The HMD 120 may estimate a future position of the HMD 120 using, e.g., fast calibration data from the IMU 150. For example, the HMD 120 may determine previous positions (which may include intermediate positions of a reference point of the HMD 120), velocity vectors for previous locations of the HMD 120, and/or acceleration vectors for previous locations of the HMD 120, using the fast calibration data. The HMD 120 may then estimate one or more future positions of the HMD 120 using the determined previous positions, velocity vectors, and/or acceleration vectors. For example, the HMD 120 may utilize one or more standard motion estimation algorithms to determine the estimated one or more future positions. A motion estimation algorithms may include, e.g., Kalman filtering, complementary filtering, some other algorithm that can predict a future position of the HMD 120, or some combination thereof.

The HMD 120 generates 320 a plurality of synthetic frames using original frames from content having a first frame rate and the estimated one or more future positions. As discussed above, with regard to FIG. 2, the HMD 120 generates enough synthetic frames such that the first frame rate may be upsampled to a second, faster, frame rate. For example, the HMD 120 may generate a synthetic frame using Yaw/Pitch Correction, ASW, etc., as discussed above with reference to FIG. 2. Additionally, in some embodiments, the frames received from the console 110 may be adjusted frames.

The HMD 120 upsamples 330 the content from the first frame rate to a second frame rate using the synthetic frames to generate augmented content. The augmented content has a second frame rate that is faster than the first frame rate. For example, the second frame rate may be a factor of five times faster than the first frame rate.

The HMD 120 presents 340 the augmented content at the second frame rate. For example, the HMD 120 presents the augmented content at the second frame rate via the electronic display 130.

HMD System Overview

Figure 4:
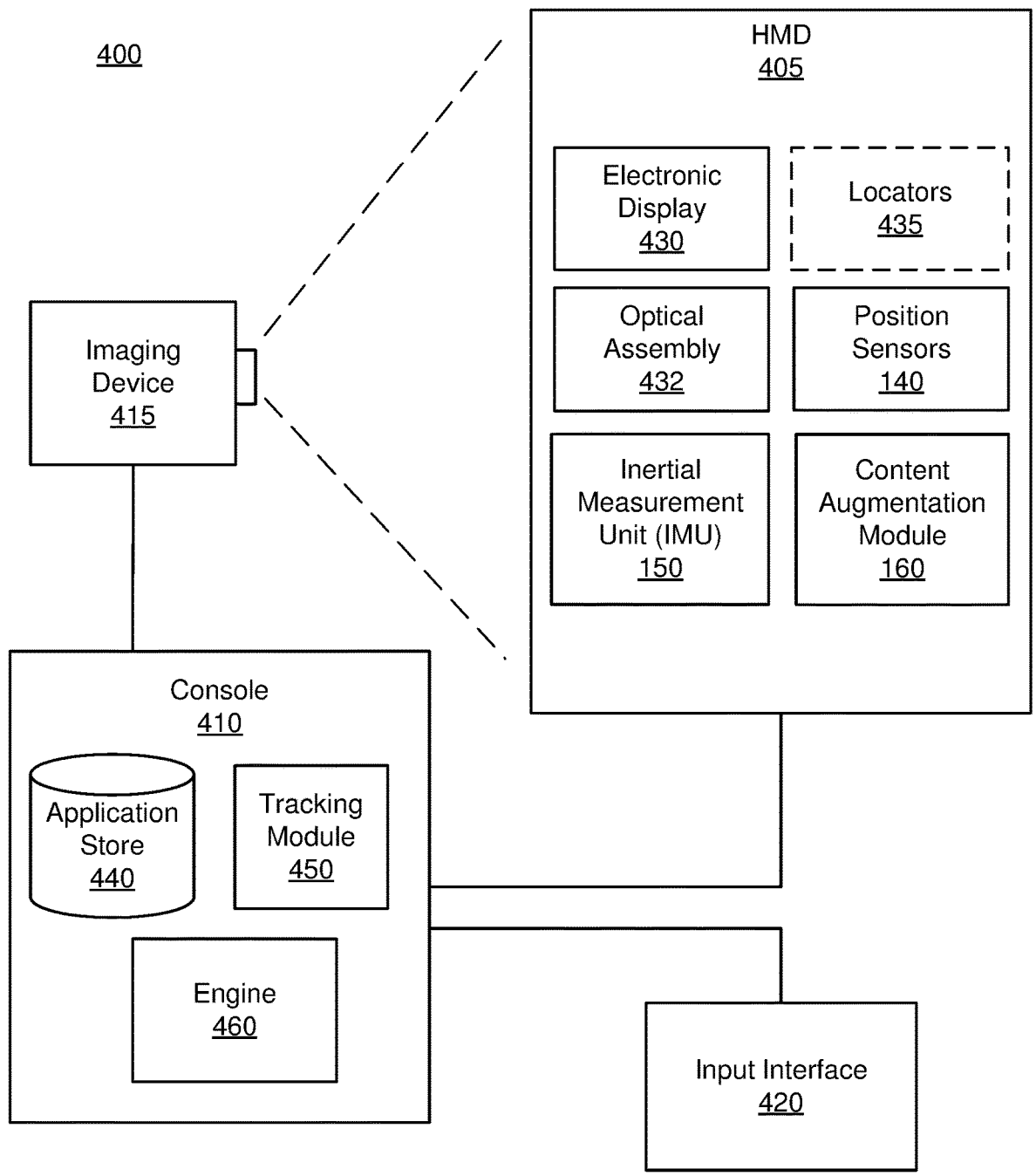
FIG. 4 is a block diagram of a HMD system, in accordance with one or more embodiments.

FIG. 4 is a block diagram of one embodiment of a HMD system 400 in which a console 410 operates. The HMD system 400 may operate in an artificial reality system. In this example, the HMD system 400 includes a HMD 405, an imaging device 415, and an input interface 420, which are each coupled to the console 410. While FIG. 4 shows a single HMD 405, a single imaging device 415, and a single input interface 420, in other embodiments, any number of these components may be included in the system. For example, there may be multiple HMDs 405 each having an associated input interface 420 and being monitored by one or more imaging devices 415, with each HMD 405, input interface 420, and imaging devices 415 communicating with the console 410. In alternative configurations, different and/or additional components may also be included in the HMD system 400.

The HMD 405 may act as an artificial reality system. The HMD 405 may augment views of a physical, real-world environment with computer-generated elements (e.g., images, video, sound, etc.). The HMD 405 presents content to a user. In some embodiments, the HMD 405 is an embodiment of the HMD 120 described above with reference to FIG. 1. Another example of the HMD 405 is described with reference to FIG. 5. Example content includes images, video, audio, or some combination thereof. Audio content may be presented via a separate device (e.g., speakers and/or headphones) external to the HMD 405 that receives audio information from the HMD 405, the console 410, or both. The HMD 405 includes an electronic display 430, optical assembly 432, the position sensors 140, the IMU 150, and the content augmentation module 160. Optionally, the HMD 405 may include one or more locators 435.

The electronic display 430 displays 2D or 3D images to the user in accordance with data received from the console 410. The electronic display 430 may be an embodiment, of the electronic display 130 in FIG. 1. In various embodiments, the electronic display 430 comprises a single electronic display or multiple electronic displays (e.g., a display for each eye of a user). Examples of the electronic display 430 include: a LCD, an OLED display, an ILED display, an AMOLED display, a TOLED display, some other display, or some combination thereof. In some embodiments, the electronic display 430 includes an augmented memory. The memory is large enough to accommodate the frame size and high frame rate of augmented content. The memory is large enough such that it stores at least two successive frames.

The optical assembly 432 magnifies image light received from the electronic display 430, corrects optical errors associated with the image light, and presents the corrected image light to a user of the HMD 405. The optical assembly 432 may include a plurality of optical elements. Example optical elements included in the optical assembly 432 include: an aperture, a Fresnel lens, a convex lens, a concave lens, a filter, a reflecting surface, or any other suitable optical element that affects image light. Moreover, the optical assembly 432 may include combinations of different optical elements. In some embodiments, one or more of the optical elements in the optical assembly 432 may have one or more coatings, such as partially reflective or anti-reflective coatings.

Magnification and focusing of the image light by the optical assembly 432 allows the electronic display 430 to be physically smaller, weigh less and consume less power than larger displays. Additionally, magnification may increase the field-of-view of the content presented by the electronic display 430. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 432 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 430 for display is pre-distorted, and the optical assembly 432 corrects the distortion when the optical assembly 432 receives image light from the electronic display 430 generated based on the content.

In some embodiments, the HMD 405 may include one or more locators 435. The locators 435 are objects that may be located in specific positions on the HMD 405 relative to one another and relative to a specific reference point on the HMD 405. A locator 435 may be a light emitting diode (LED), a corner cube reflector, a reflective marker, a type of light source that contrasts with an environment in which the HMD 405 operates, or some combination thereof. Active locators 435 (i.e., an LED or other type of light emitting device) may emit light in the visible band (~380 nm to 440 nm), in the infrared (IR) band (~440 nm to 1 mm), in the ultraviolet band (10 nm to 380 nm), some other portion of the electromagnetic spectrum, or some combination thereof.

The locators 435 can be located beneath an outer surface of the HMD 405, which is transparent to the wavelengths of light emitted or reflected by the locators 435 or is thin enough not to substantially attenuate the wavelengths of light emitted or reflected by the locators 435. Further, the outer surface or other portions of the HMD 405 can be opaque in the visible band of wavelengths of light. Thus, the locators 435 may emit light in the IR band while under an outer surface of the HMD 405 that is transparent in the IR band but opaque in the visible band.

As described above with reference to FIG. 1, the IMU 150 is an electronic device that generates fast calibration data based on measurement signals received from one or more of the position sensors 140, which generate one or more measurement signals in response to motion of HMD 405. Examples of the position sensors 140 include accelerometers, gyroscopes, magnetometers, other sensors suitable for detecting motion, correcting error associated with the IMU 150, or some combination thereof.

Based on the measurement signals from the position sensors 140, the IMU 150 generates fast calibration data indicating an estimated position of the HMD 405 relative to an initial position of the HMD 405. For example, the position sensors 140 include multiple accelerometers to measure translational motion (forward/back, up/down, left/right) and multiple gyroscopes to measure rotational motion (e.g., pitch, yaw, and roll). The IMU 150 can, for example, rapidly sample the measurement signals and calculate the estimated position of the HMD 405 from the sampled data. For example, the IMU 150 integrates measurement signals received from the accelerometers over time to estimate a velocity vector and integrates the velocity vector over time to determine an estimated position of a reference point on the HMD 405. The reference point is a point that may be used to describe the position of the HMD 405. While the reference point may generally be defined as a point in space, in various embodiments, a reference point is defined as a point within the HMD 405 (e.g., a center of the IMU 150). Alternatively, the IMU 150 provides the sampled measurement signals to the console 410, which calculates the fast calibration data.

The IMU 150 can additionally receive one or more calibration parameters from the console 410. As further discussed below, the one or more calibration parameters are used to maintain tracking of the HMD 405. Based on a received calibration parameter, the IMU 150 may adjust one or more of the IMU parameters (e.g., sample rate). In some embodiments, certain calibration parameters cause the IMU 150 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The content augmentation module 160 generates augmented content from content received from the console 410. As described above with regard to FIGS. 1-3, the content augmentation module 160 predicts future positions of the HMD 405, and generates synthetic frames based on the content from the console 410 and the predicted future positions. In alternate embodiments, the content augmentation module 160 receives adjusted content from the console 410. And the content augmentation module 160 generates a plurality of synthetic frames using frames from the adjusted content.

The content augmentation module 160 upsamples the content with the synthetic frames to create the augmented content, and provides the augmented content to the electronic display 430. In some embodiments, some or all of the content augmentation module may be part of the electronic display 430.

The imaging device 415 generates slow calibration data in accordance with calibration parameters received from the console 410. Slow calibration data includes one or more images showing observed positions of the locators 435 that are detectable by imaging device 415. The imaging device 415 may include one or more cameras, one or more video cameras, other devices capable of capturing images including one or more locators 435, or some combination thereof. Additionally, the imaging device 415 may include one or more filters (e.g., for increasing signal to noise ratio). The imaging device 415 is configured to detect light emitted or reflected from the locators 435 in a field of view of the imaging device 415. In embodiments where the locators 435 include passive elements (e.g., a retroreflector), the imaging device 415 may include a light source that illuminates some or all of the locators 435, which retro-reflect the light towards the light source in the imaging device 415. Slow calibration data is communicated from the imaging device 415 to the console 415, and the imaging device 415 receives one or more calibration parameters from the console 410 to adjust one or more imaging parameters (e.g., focal length, focus, frame rate, ISO, sensor temperature, shutter speed, aperture, etc.).

The input interface 420 is a device that allows a user to send action requests to the console 410. An action request is a request to perform a particular action. For example, an action request may be to start or end an application or to perform a particular action within the application. The input interface 420 may include one or more input devices. Example input devices include a keyboard, a mouse, a game controller, or any other suitable device for receiving action requests and communicating the received action requests to the console 410. An action request received by the input interface 420 is communicated to the console 410, which performs an action corresponding to the action request. In some embodiments, the input interface 420 may provide haptic feedback to the user in accordance with instructions received from the console 410. For example, haptic feedback is provided by the input interface 420 when an action request is received, or the console 410 communicates instructions to the input interface 420 causing the input interface 420 to generate haptic feedback when the console 410 performs an action.

The console 410 provides content to the HMD 405 for presentation to the user in accordance with information received from the imaging device 415, the HMD 405, or the input interface 420. In the example shown in FIG. 4, the console 410 includes an application store 440, a tracking module 450, and an engine 460. Some embodiments of the console 410 have different or additional modules than those described in conjunction with FIG. 4. Similarly, the functions further described below may be distributed among components of the console 410 in a different manner than is described here.

The application store 440 stores one or more applications for execution by the console 410. An application is a group of instructions, that when executed by a processor, generates content for presentation to the user. Content generated by an application may be in response to inputs received from the user via movement of the HMD 405 or the input interface 420. Examples of applications include gaming applications, conferencing applications, video playback application, or other suitable applications.

The tracking module 450 calibrates the system 400 using one or more calibration parameters and may adjust one or more calibration parameters to reduce error in determining position of the HMD 405. For example, the tracking module 450 adjusts the focus of the imaging device 415 to obtain a more accurate position for observed locators 435 on the HMD 405. Moreover, calibration performed by the tracking module 450 also accounts for information received from the IMU 150. Additionally, if tracking of the HMD 405 is lost (e.g., imaging device 415 loses line of sight of at least a threshold number of locators 435), the tracking module 450 re-calibrates some or all of the system 400 components.

Additionally, the tracking module 450 tracks the movement of the HMD 405 using slow calibration information from the imaging device 415 and determines positions of a reference point on the HMD 405 using observed locators from the slow calibration information and a model of the HMD 405. The tracking module 450 also determines positions of the reference point on the HMD 405 using position information from the fast calibration information from the IMU 150 on the HMD 405. Additionally, the tracking module 450 may use portions of the fast calibration information, the slow calibration information, or some combination thereof, to predict a future location of the HMD 405, which is provided to the engine 460.

The engine 460 executes applications within the system 400 and receives position information, acceleration information, velocity information, predicted future positions, or some combination thereof for the HMD 405 from the tracking module 450. Based on the received information, the engine 460 determines content to provide to the HMD 405 for presentation to the user, such as a virtual scene, one or more virtual objects to overlay onto a real world scene, etc. Additionally, the engine 460 performs an action within an application executing on the console 410 in response to an action request received from the input interface 420 and provides feedback to the user that the action was performed. The provided feedback may be visual or audible feedback via the HMD 405 or haptic feedback via the input interface 420.

In some embodiments, the engine 460 estimates one or more future positions of the HMD 405 using the fast calibration data from the HMD 405. The engine 460 generates warping parameters based on the one or more estimated future positions, and provides 460 the warping parameters to the HMD 405 with the content.

Figure 5:
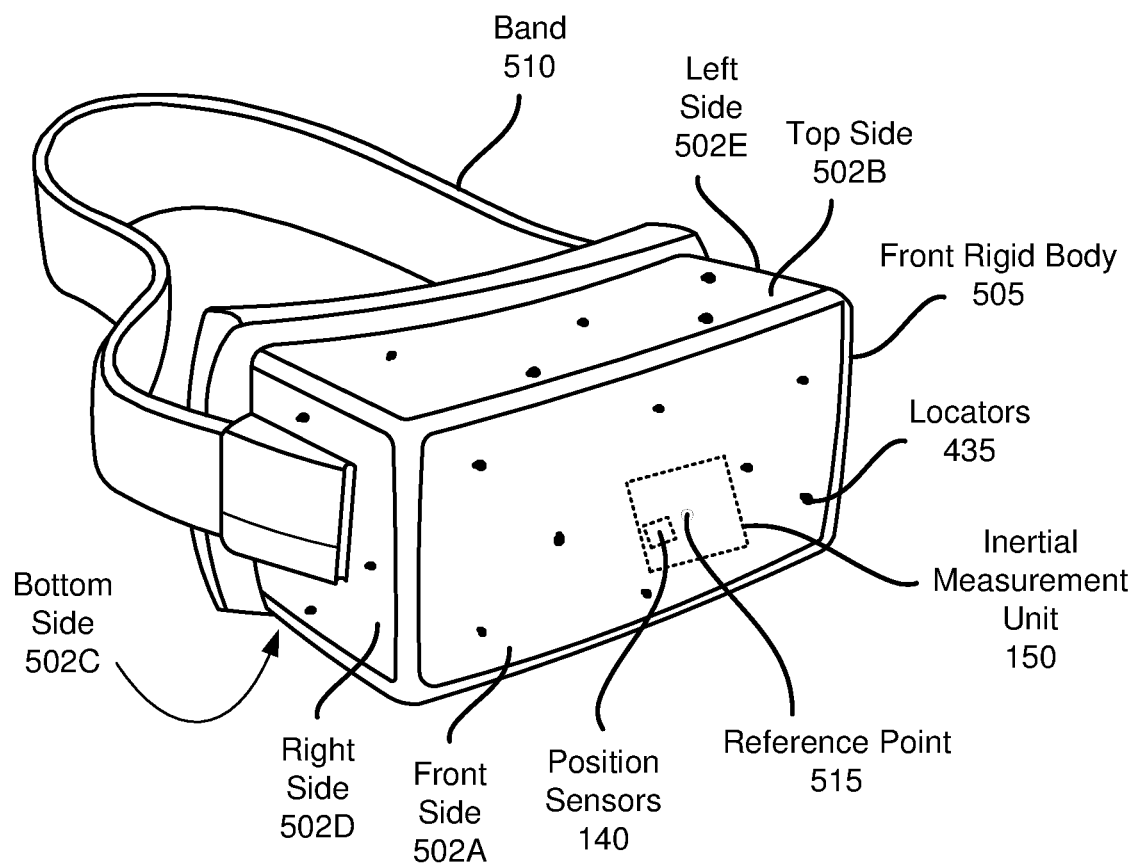
FIG. 5 is a diagram of an HMD, in accordance with one or more embodiments.

FIG. 5 is a diagram of a HMD 500, in accordance with one or more embodiments. The HMD 500 is an embodiment of the HMD 405. The HMD 500 may be part of an artificial reality system. In embodiments that describe AR system and/or a MR system, portions of a front side 502A of the HMD 500 are at least partially transparent in the visible band (~380 nm to 750 nm), and portions of the HMD 500 that are between the front side 502A of the HMD 500 and an eye of the user are at least partially transparent (e.g., a partially transparent electronic display). The HMD 500 includes a front rigid body 505 and a band 510.

The front rigid body 505 includes an electronic display (not shown), the IMU 150, the one or more position sensors 140, and the locators 435. In the embodiment shown by FIG. 5, the position sensors 140 are located within the IMU 150, and neither the position sensors 140 nor the IMU 150 are visible to the user.

The locators 435 are located in fixed positions on the front rigid body 505 relative to one another and relative to a reference point 515. In the example of FIG. 5, the reference point 515 is located at the center of the IMU 150. Each of the locators 435 emit light that is detectable by the imaging device 415. Locators 435, or portions of locators 435, are located on the front side 502A, a top side 502B, a bottom side 502C, a right side 502D, and a left side 502E of the front rigid body 505 in the example of FIG. 5.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
　a head-mounted display (HMD) configured to output calibration data; and
　a console configured to:
　　estimate one or more future positions of the HMD based at least in part on the calibration data,
　　generate warping parameters based on the one or more future positions,
　　process content for presentation using the warping parameters, and
　　provide the processed content having a plurality of frames at a first frame rate to the HMD,
　the HMD configured to:
　　generate one or more synthetic frames using one or more of the frames from the processed content and information about the one or more future positions, and
　　upsample the processed content from the first frame rate to a second frame rate by inserting the one or more synthetic frames into the processed content to generate augmented content.

2. The system of claim 1, wherein the HMD is further configured to:
　extract at least one of velocity vector information and acceleration vector information from the calibration data; and
　estimate the one or more future positions further using the at least one of the velocity vector information and the acceleration vector information.

3. The system of claim 1, wherein the HMD is further configured to:
　determine, using one or more time values associated with one or more intermediate estimated positions of a reference point on the HMD, at least one of velocity vector information and acceleration vector information for the reference point; and
　estimate the one or more future positions further based on at least one of the one or more intermediate estimated positions, the velocity vector information and the acceleration vector information.

4. The system of claim 1, wherein the HMD is further configured to:

estimate the one or more future positions further based on at least one of Kalman filtering of the calibration data and complementary filtering of the calibration data.

5. The system of claim 1, wherein the HMD is further configured to:
perform yaw/pitch correction on the one or more frames to generate the one or more synthetic frames, the yaw/pitch correction based in part on the estimated one or more future positions.

6. The system of claim 1, wherein the HMD is further configured to:
perform asynchronous space warp on the one or more frames to generate the one or more synthetic frames.

7. The system of claim 1, wherein the HMD is further configured to:
determine a number of the one or more synthetic frames for generation based on the first frame rate and the second frame rate.

8. The system of claim 1, wherein the HMD is further configured to:
warp features of an image frame of the processed content to create a synthetic frame of the one or more synthetic frames, the warp of the features of the image frame is based on information about a future position of the one or more future positions.

9. The system of claim 1, wherein the console is further configured to:
estimate the one or more future positions further based on one or more images showing positions of locators on the HMD.

10. The system of claim 1, wherein the console is further configured to:
compensate for motion of at least one of the HMD and one or more virtual objects by processing the content using the warping parameters.

11. A head-mounted display (HMD) comprising:
an inertial measurement unit (IMU) configured to output calibration data;
a frame buffer configured to receive, from a console at a first frame rate, content having a plurality of frames for presentation, the content being processed at the console using warping parameters, the warping parameters being generated based on one or more future positions of the HMD, the one or more future positions being estimated at the console using the calibration data; and
an upsampling module configured to:
generate one or more synthetic frames using one or more of the frames from the processed content and information about the one or more future positions, and
upsample the processed content from the first frame rate to a second frame rate by inserting the one or more synthetic frames into the processed content to generate augmented content.

12. The HMD of claim 11, further comprising a position prediction module configured to:
extract one or more intermediate estimated positions of a reference point on the HMD from the calibration data;
extract at least one of velocity vector information and acceleration vector information from the calibration data; and
estimate the one or more future positions further based on at least one of the one or more intermediate estimated positions, the velocity vector information and the acceleration vector information.

13. The HMD of claim 11, further comprising a position prediction module configured to:
extract one or more intermediate estimated positions of a reference point on the HMD from the calibration data;
determine, using the one or more intermediate estimated positions and one or more time values associated with the one or more intermediate estimated positions, at least one of velocity vector information and acceleration vector information for the reference point; and
estimate the one or more future positions further based on at least one of the one or more intermediate estimated positions, the velocity vector information and the acceleration vector information.

14. The HMD of claim 11, further comprising a position prediction module configured to:
estimate the one or more future positions further based on at least one of Kalman filtering and complementary filtering of the calibration data.

15. The HMD of claim 11, wherein the upsampling module is further configured to:
perform yaw/pitch correction on the one or more frames to generate the one or more synthetic frames, the yaw/pitch correction based in part on the estimated one or more future positions.

16. The HMD of claim 11, wherein the upsampling module is further configured to:
warp features of a frame of the processed content based on information about a future position of the one or more future positions to create an image frame; and
generate a synthetic frame, of the one or more synthetic frames, using the image frame.

17. The HMD of claim 11, wherein the upsampling module is further configured to:
calculate an inverse warp that maps coordinates on an image from the processed content to coordinates on a display of the HMD; and
generate at least one synthetic frame, of the one or more synthetic frames, based on the inverse warp.

18. A method comprising:
generating calibration data of an apparatus;
receiving, at a first frame rate, content having a plurality of frames for presentation, the content being processed using warping parameters, the warping parameters being generated based on one or more future positions of the apparatus, the one or more future positions being estimated using the calibration data;
generating one or more synthetic frames using one or more of the frames from the processed content and information about the one or more future positions; and
upsampling the processed content from the first frame rate to a second frame rate by inserting the one or more synthetic frames into the processed content to generate augmented content.

19. The method of claim 18, further comprising:
extracting one or more intermediate estimated positions of a reference point on the apparatus from the calibration data;
extracting at least one of velocity vector information and acceleration vector information from the calibration data; and
estimating the one or more future positions further based on at least one of the one or more intermediate estimated positions, the velocity vector information and the acceleration vector information.

20. The method of claim 18, further comprising:
performing yaw/pitch correction on the one or more frames to generate the one or more synthetic frames, the yaw/pitch correction based in part on the estimated one or more future positions.

* * * * *